United States Patent

De Bell et al.

[15] 3,691,314

[45] Sept. 12, 1972

[54] METHOD FOR RECORDING PREDETERMINED INFORMATION DURATION WITHIN PRE-SET RECORD LENGTH

[72] Inventors: Lawrence R. De Bell, Bethany; David D. Price, Oklahoma City, both of Okla.

[73] Assignee: Economy Co., Oklahoma City, Okla. ; by said De Bell

[22] Filed: Nov. 2, 1970

[21] Appl. No.: 86,261

[52] U.S. Cl........................179/100.2 S, 340/174.1 A

[51] Int. Cl.............................................G11b 15/52

[58] Field of Search..179/100.1 R, 100.2 S, 100.2 M; 340/174.1 A; 274/4 D; 35/35 C, 9 A

[56] References Cited

UNITED STATES PATENTS

| | | | |
|---|---|---|---|
| 2,797,263 | 6/1957 | Dolby | 179/100.2 S |
| 3,596,007 | 7/1971 | Price et al. | 179/100.2 S |
| 3,350,511 | 10/1967 | Johnson | 179/100.2 S |

*Primary Examiner*—Bernard Konick
*Assistant Examiner*—Jay P. Lucas
*Attorney*—Dunlap, Laney, Hessin & Dougherty

[57] ABSTRACT

A method and apparatus for recording information of predetermined duration within allotted tape space of a recording track. The method is particularly applicable to plural track record mediums which include companion audio and control tone information recorded in adjacent disposition, and one record track is reserved for pre-recording of a plurality of pulses at a constant rate per linear measure. During recording of audio information, the recording tape speed is controlled by analog computational apparatus which resolves information length versus the available recording space to vary the recording speed so that message termination occurs at a designated point on the record medium.

8 Claims, 4 Drawing Figures

INVENTORS
LAWRENCE R. DE BELL &
DAVID D. PRICE JR.
BY
Dunlap, Laney, Hessin & Dougherty
ATTORNEYS

INVENTORS
LAWRENCE R. DE BELL &
DAVID D. PRICE JR.

BY
Dunlap, Laney, Hessin & Dougherty
ATTORNEYS

INVENTORS
LAWRENCE R. DEBELL &
DAVID D. PRICE JR.

BY
Dunlap, Laney, Hessin & Dougherty
ATTORNEYS

METHOD FOR RECORDING PREDETERMINED INFORMATION DURATION WITHIN PRE-SET RECORD LENGTH

BACKGROUND OF THE INVENTION

1. Field Of The Invention

The invention relates generally to a variable speed recording control method and apparatus and, more particularly, but not by way of limitation, it relates to computational apparatus for controlling the recording of multi-channel, variable speed, parallel message segments and companion control tone on magnetic tape medium.

2. Description Of the Prior Art

The prior art does not, within present knowledge, include teachings directed to the problem of plural track, variable speed recording such as are dealt with in the present specification. The invention is intended for use in recording of plural channel record information wherein designated channels may have different pre-set record durations, and wherein various of the plural record tracks are intended for playback at appreciably different speeds. It is burdensome to manually calculate the precise record speeds required for each portion of information, and this becomes especially impractical where it is desired to record plural record tracks, e.g., tutoring branching information, some message durations being multiples of others as between the several tracks. Also, there is no assurance that the message or information duration can be properly recorded within an allotted record space due to variation in time required for the tape to reach its proper speed, power fluctuations, etc. While various prior art teachings disclose control tone or pulse tracking of record speed, no teachings are known which utilize pulse readout for the purpose of controlling recording of a predetermined duration of message and companion tone signal between designated start and stop limits along parallel record tracks of a record medium.

SUMMARY OF THE INVENTION

The present invention contemplates the method of recording a fixed duration of message information within pre-set bounds along a recording medium through continuous resolution of elapsed message duration versus allotted record length and related regulation of recording speed. The recording procedure utilizes a recording medium having a separate one of plural record tracks which includes pre-recorded pulses at a constant number per record length, and playback means for reading out said pulses during recording to provide a record expenditure rate signal. Resistive resolver apparatus performs an analog computation to generate a record drive voltage as a function of record length remaining and the reciprocal of time remaining of an information segment duration such that the speed of the record drive is continually controlled as a function of the available recording space.

Therefore, it is an object of the present invention to provide a method for placing intelligence of known duration within a known expanse of recording medium.

It is also an object of the invention to provide apparatus for recording known message lengths and companion control tones within predetermined spaces on different ones of plural record tracks along a magnetic record tape.

It is still further an object of the present invention to provide such record coordination apparatus for use with plural record tracks which maintain common start and/or stop limit designations as between one or more parallel tracks.

Finally, it is an object of the present invention to provide a method for recording precise record length within allotted tape space for plural track records of the tape utilized in information tutoring systems wherein playback branching between selected record tracks contain different orders of information.

Other objects and advantages of the invention will be evident from the following detailed description when read in conjunction with the accompanying drawings which illustrate the invention.

BRIEF DESCRIPTION OF THE INVENTION

DETAILED DESCRIPTION OF THE INVENTION

Figure 1:
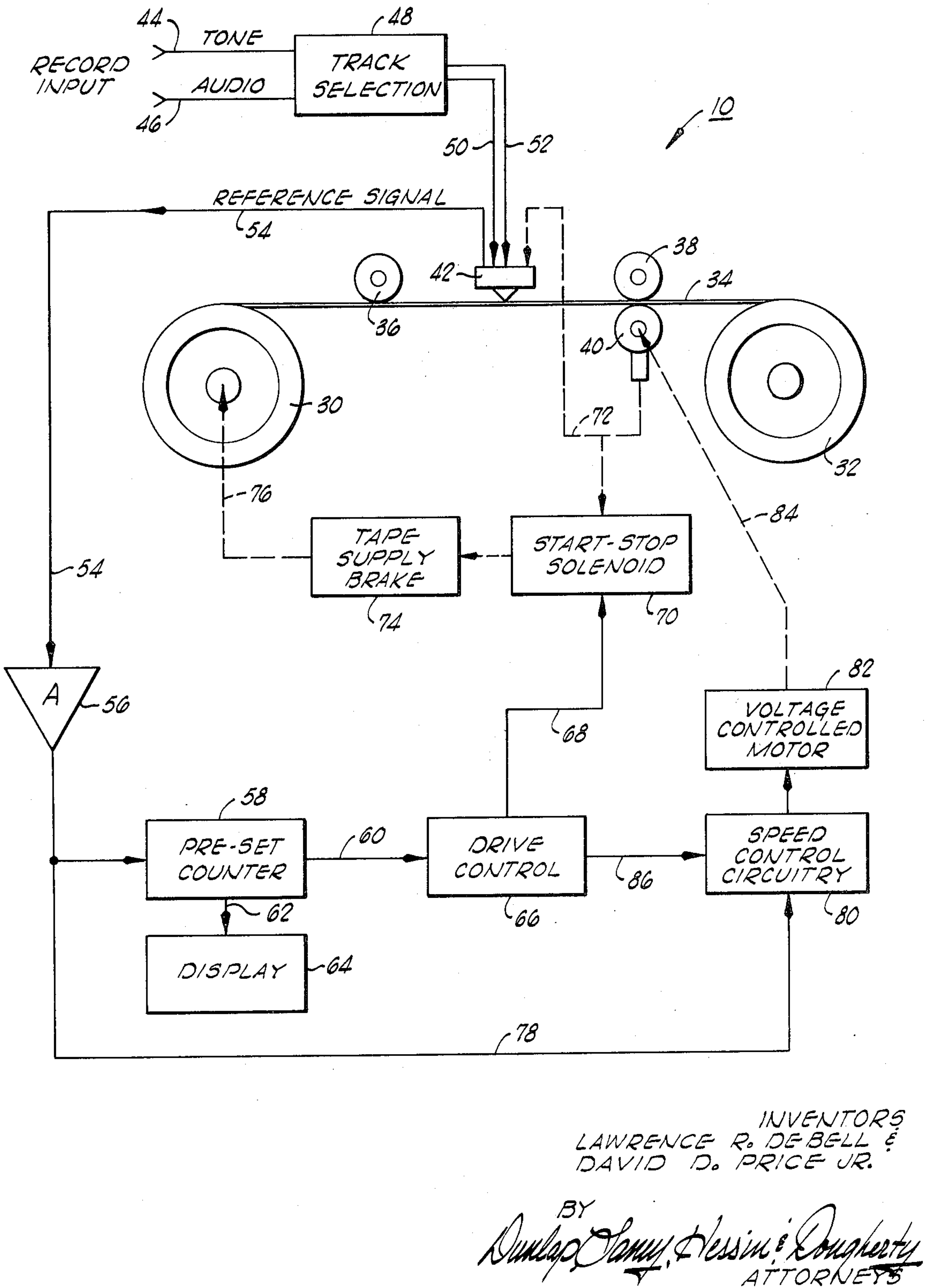
FIG. 1 is a block diagram illustrating apparatus suitable for carrying out the method of the invention.

FIG. 1 represents a generalized form of recording apparatus 10 which may be utilized to carry out the method of the invention. That is, recording apparatus 10 is utilized to record predetermined segments of information along a record track within an allotted tape space having definite and precise start-stop limits. Such recording technique is found to be especially advantageous when recording plural track records such as are utilized in teaching machines and like apparatus, and this is particularly true with respect to branching-type systems wherein appreciably different volumes of information or message length may be contained on each of adjacent but equal length record track spaces.

One form of record medium which may be best recorded utilizing the method of the invention is a multi-channel, variable speed, parallel message tutorial information recording such as that shown in FIG. 1. The record 12 is a 14-track record medium but it should be understood that the present method may be employed with two, three or more record channels to enable the advantageous information placement teachings. A first record track 14 contains pre-recorded pulses at some selected frequency and constant spacing along record 12. In one form of the present invention, the record track 14 is pre-recorded at a constant speed of exactly 10 inches per second with 1,000 pulses per second to enable a constant reference of one hundred pulses per inch of the record medium length.

Remaining record tracks of record 12 are then utilized for parallel channel information. In this case, where a branching type of audio presentation is used, remaining parallel channels 16 are divided between audio channels B through G, each of which includes both a control tone record track and an audio record track. Each of the B through G tone record tracks carries a constant frequency audio tone for tape speed reference as related to its associated audio record track, and such audio tone later serves as speed-keeping reference during playback of its associated audio record track. The remaining one of record tracks 16 or audio record track A is utilized for maximum speed intelligence recording whenever such is deemed necessary or useful. A plural track record such as record 12 may be utilized in playback apparatus such as that disclosed in U.S. patent application Ser. No. 755,573, filed Aug. 27, 1968 in the name of Price et al. and entitled "Apparatus for Playback of Plural Track Records", now Pat. No. 3,596,007; and such as the record 12 will find specific utilization in teaching systems such as disclosed in U.S. Pat. No. 3,501,851 in the name of Price et al.

Record 12 illustrates the practice of information branching utilizing information segments of varying lengths as recorded along equal lengths of tape space. It can be noted too that apparently equal or nearly equal segments of record track length are made to contain quite different time content of message through controlled regulation of the recording speed. Thus, with particular reference to record track D, a first segment 18 lasts for 13.5 seconds and takes up a disproportionate length of record space as compared to a following segment 20 which, being run at a much slower speed, contains 83.6 seconds of information. Such variations are effected by control of the recording tape speed, an integral part of the present invention which further serves to place information segments of predetermined time-length within pre-set record track-length. The related control tone record track for each audio track is similarly placed at proper frequency to effect playback transport control at proper speed.

Referring again to FIG. 1, the recording apparatus 10 utilizes a record transport which includes a supply reel 30 and a takeup reel 32 containing a recording medium 34. The recording medium 34 may be controlled and driven by conventional transport mechanism, but it is here illustrated in association with a suitable idler wheel 36 and idler wheel 38 in combination with a drive capstan 40. A plural channel recording and playback head assembly 42 is also placed in contactable disposition adjacent recording medium 34.

Information for recording may be input via control tone signal input 44 and audio information signal input 46 to a track selection stage 48. Track selection stage 48 may be any form of selector mechanism for receiving one or more tone-audio signal pairs and thereafter conducting such signals to the proper track recording head of head assembly 42.

Thus, input leads shown generally as leads 50 and 52 apply both control tone and audio information to a selected pair of recording heads in head assembly 42. A playback head within head assembly 42 transduces signal from the pulse reference track, e.g., record track 14 of record 12 in FIG. 2, whereupon the pulse reference signal is output on a lead 54 for input to a signal amplifier 56 and additional control circuitry, as will be further described.

The amplified pulse reference signal from amplifier 56 is applied to a pre-set counter 58 which can be preadjusted to provide an output on a lead 60 after a selected number of pulse counts. An output 62 from pre-set counter 58 is applied to a suitable display 64 such that pulses from the record medium pulse reference track are counted and displayed as a direct digital measure of tape length in inches. In one present construction of the invention, the display 64 is a well-known form of digital readout mechanism accurate to two decimal places.

The output 60, the pre-set output from counter 58, provides a momentary actuation output coincident with the selected digit, and such output is applied to a drive control 66 which serves to control the tape transport. Thus, actuation of drive control 66 produces an output on lead 68 to energize a start/stop solenoid 70 which serves to engage the heads and drive capstan with the recording medium 34. Thus, solenoid 70 is energized to engage drive capstan 40 and also to engage head assembly 42 as indicated by mechanical linkage 72; the start/stop solenoid 70 also serves to actuate a tape supply brake 74 via linkage 76 to stop the supply reel 30 whenever solenoid 70 effects the stop function to disengage drive capstan 40 and head assembly 42. Thus, the recording apparatus 10 may be set to start at count zero and to stop at any predetermined record position, as determined by pre-set counter 58 operating through drive control 66 and start/stop solenoid 70.

Amplified pulse output from amplifier 56 is also applied via a lead 78 to speed control circuitry 80 which serves to control the speed of the transport drive, i.e., the voltage controlled motor 82 as connected via a linkage 84 to drive capstan 40. Such transport drive is a conventional form of mechanism and additional drive interconnection of conventional form (not shown) would be provided to drive takeup reel 32 to maintain record medium 34 in taut disposition. The speed control circuitry 80 is controlled as to start and stop limits by means of input on lead 86 from drive control 66, and it develops a variable analog voltage in response to count input from pulse reference signal on lead 78, which voltage is applied to drive voltage controlled motor 82 at a proper speed to accommodate whatever the requirements of the particular audio information and control tone segment.

Figure 3:
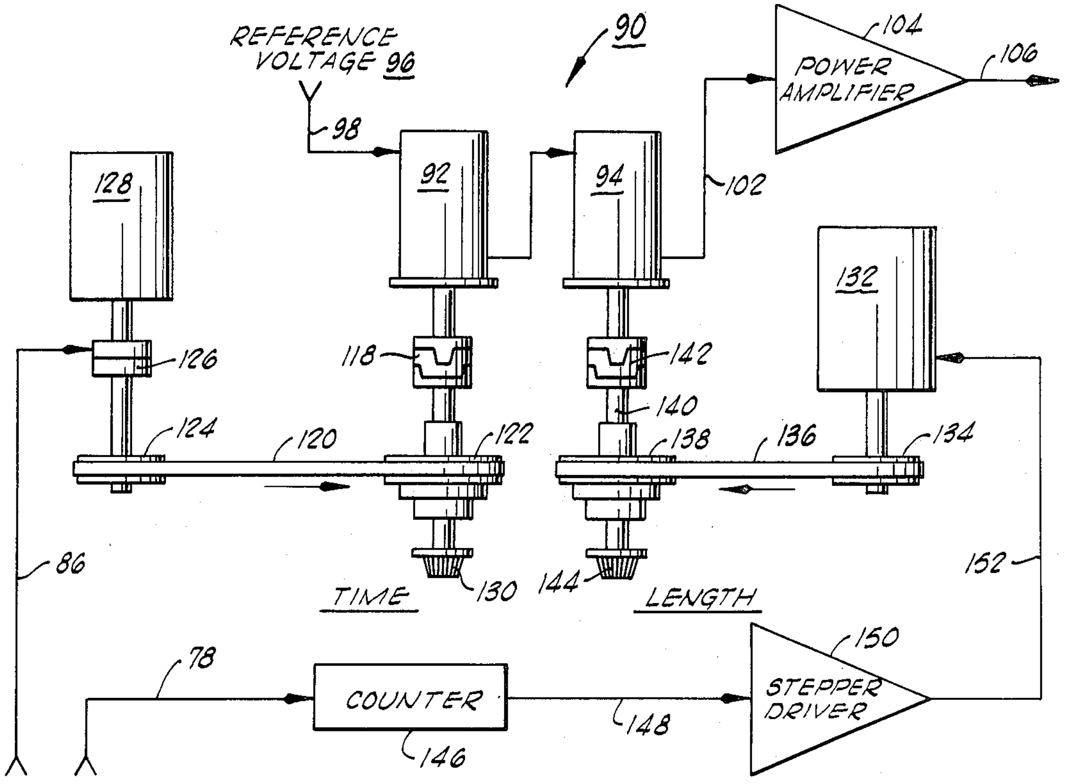
FIG. 3 is a functional diagram of an analog computer apparatus which provides a speed control function in carrying out the method of the invention.
Figure 4:
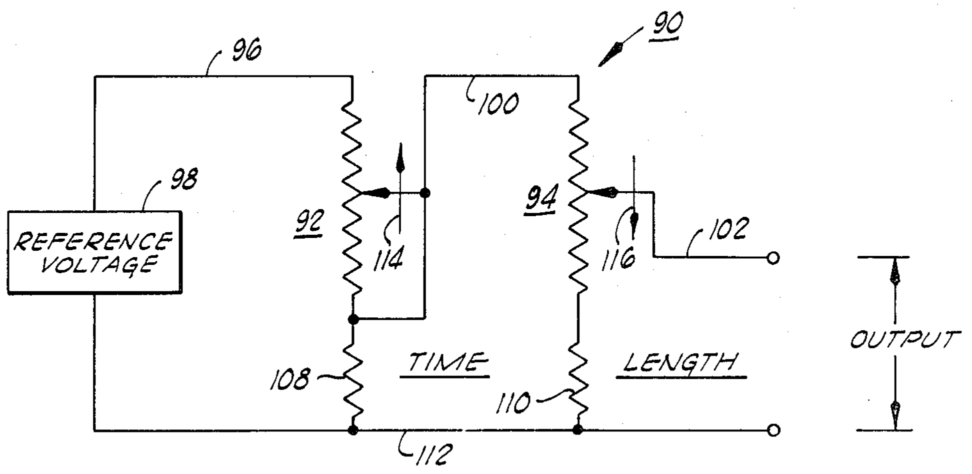
FIG. 4 is a schematic diagram of the analog computer apparatus of FIG. 3.

The speed control circuitry 80 may take the form of an analog computing circuit 90 such as that shown in FIG. 3. Analog computing circuit 90 is adjustable both as to requisite recording time and record length to constantly track the remaining portion of an information segment versus the unused recording space to effect speed adjustment such that information segment and recording space terminate simultaneously. Analog circuit 90 consists of a pair of linear helical potentiometers 92 and 94, e.g., 10-turn precision 100K potentiometers connected in series with a reference voltage input 96. Reference voltage 96 may be any source of A-C or D-C voltage as applied via lead 98 to helical potentiometer 92. The schematic diagram of FIG. 4 shows particular interconnection of helical potentiometers 92 and 94 with a lead 100 connecting potentiometers 92 and 94 in series while output from helical potentiometer 94 is taken on the wiper output lead 102 for input to a power amplifier 104 which provides output on lead 106 of a variable voltage signal for application to drive voltage controlled motor 82 (FIG. 1).

Referring again to FIG. 4, each of the helical potentiometers 92 and 94 may be, for example, 100K resistance values connected in series with respective 100 Ohm resistors 108 and 110 which return via lead 112 to the source of reference voltage 98. During operation of the recording apparatus 10 and, therefore, the speed control circuitry 80, the respective potentiometers 92 and 94 are oppositely driven in reciprocal action as indicated by the wiper directional arrows 114 and 116. The rotational input to each of helical potentiometers 92 and 94 is supplied at a controlled rate so that the analog circuitry 90 provides continual resolution of the equation.

$$\frac{X\ (\text{max.}) - X\ (\text{used})}{T\ (\text{max.}) - T\ (\text{used})} = S \text{ instantaneous}$$

where $X$ = *tape length in inches*; $T$ = time of message in seconds; and $S$ = speed of tape in inches per second. In presently constructed embodiments, the practical limits of such analog computer mechanism dictates that $X$ be variable from 1 inch to 1,000 inches, that $T$ be variable from 1 second to 1,000 seconds, and that the speed value $S$ range from 2 inches per second to 40 inches per second. However, it should be understood that such limits are variable in accordance with the exigencies of a particular application.

Referring again to FIG. 3, the TIME helical potentiometer 92 is driven through a flexible coupling 118 from a belt transmission 120, preferably a toothed belt connection, operating through a spring-loaded pulley slip clutch 122. The belt 120 receives input from a drive pulley 124 which is enabled by an electromagnetic clutch 126 receiving rotational output from a 60-cycle A-C synchronous motor 128, e.g., a Model PCDA Synchronous Motor as obtained from the Hurst Corp. of Princeton, Ind. Signal input on lead 86, as derived from drive control 66 of FIG. 1, is applied to energize the electromagnetic clutch 126 upon start-up of the record transport. A manual adjusting knob 130, which may be calibrated directly in seconds, provides rotational adjustment through pulley slip clutch 122 to pre-set the position of the rotor of helical potentiometer 92 prior to start-up of the transport.

A similar interconnection provides drive to the LENGTH helical potentiometer 94 except that initial drive input is supplied from a stepping motor 132. The stepping motor 132 may be such as a 20 step per revolution stepping motor of the type commercially available from Sigma Instruments, Incorporated of Braintree, Mass. Such a stepping motor 132 would move 18° per step and 20 steps per revolution to transmit the intermittent rotational movement through a drive pulley 134 and toothed transmission belt 136 to a spring-loaded pulley slip clutch 138. The pulley slip clutch 138 is then secured via a shaft 140 through a flexible coupling 142 to the rotor of helical potentiometer 94. A knurled knob 144 is initially settable from 1 to 1,000 inches, this setting providing rotational positioning of the rotor within helical potentiometer 94.

The synchronous motor 128 provides input of real time and revolves the rotor of helical potentiometer 92 10 times in 1,000 seconds, i.e., a rate of 0.6 RMP. In like manner, a stepping motor 132 revolves the rotor of helical potentiometer 94 10 times in 1,000 inches of tape travel. The 100 pulse per inch reference signal input on lead 78 is counted down at a rate of 100:1 in a counter 146, and the countdown output on lead 148 is then applied through a stepper driver 150 for input via lead 152 to drive stepping motor 132 at the 20 step per revolution rate. The stepping motor 132 is further coupled to the potentiometer shaft or rotor of helical potentiometer 94 through a 5:1 reduction to result in a minimum of 1.2 RPM and a maximum of 24 RPM rotational rates.

This system forms a servo-type system with feedback being derived from the record medium. Thus, after initial adjustment of knobs 130 and 144 to input the message-time and tape-length, the recording is started with the recorder tape speed controlled by the analog voltage output of the analog circuit 90. The rotors of helical potentiometers 92 and 94 are driven in opposite directions such that the analog circuit 90 maintains an output which results from the resistance ratio of helical potentiometers 92 and 94, and such value will not change unless the decrementing valves cease to track at the proper rates. At all times, the circuit 90 is working with the remaining values of time and length irrespective of the maximum or initial valves. If either potentiometer 92 or 94 should reach zero before the recording is stopped, the respective rotor shaft merely idles at zero thereby preventing any radical speed changes of the recording transport.

In operation, initial figures of message-time and allotted tape-length are set into the apparatus 90 by means of knobs 130 and 144 (FIG. 3). Thus, the TIME potentiometer 92 is connected to the A-C synchronous timing motor 128 which runs only when the tape is running, i.e., when signal input on lead 86 energizes electromagnetic clutch 126. The LENGTH potentiometer 94 is connected through a 5:1 ratio to stepping motor 132 which, in turn, is controlled by the 100 pulse per inch signal simultaneously played back from the plural channel recording medium 34. In this manner, the initial values of time and length are decremented appropriately, and a continuously accurate computation updates the speed output as necessary. In playback, the automatically controlled record playback transport faithfully follows any speed changes incurred during the recording process such that there should result no audible deterioration of message quality.

The analog circuit 90 maintains a continuous track of the function ($X$) times ($1/T$) which is equal to a speed parameter. Any initial setting of $X/T$ (length/time) will set up a ratio which is tracked or maintained through subsequent operation of the tape transport and rotation of helical potentiometers 92 and 94 (albeit in opposite rotation). Thus, dialing a pre-set time through knob 130 would result in moving the wiper element of helical potentiometer 92 downward (as shown in FIG. 4) to cause some predetermined voltage drop across a portion of the potentiometer 92 and a lesser total voltage is applied across potentiometer 94. Subsequent dialing of a predetermined tape length through manipulation of knob 144 will then move the wiper of potentiometer 94 upward to tap off a predetermined portion of that voltage then allowed to supply potentiometer 94, this output voltage being present on lead 102 as the analog voltage to drive voltage control motor 82 (FIG. 1). After recording has started and playback of reference signal through lead 54 and amplifier 56 is initiated, the respective TIME and LENGTH potentiometer wipers move progressively in the direction of arrows 114 and 116 maintaining a proper speed ratio consonant with message time in the allotted tape space.

Figure 2:
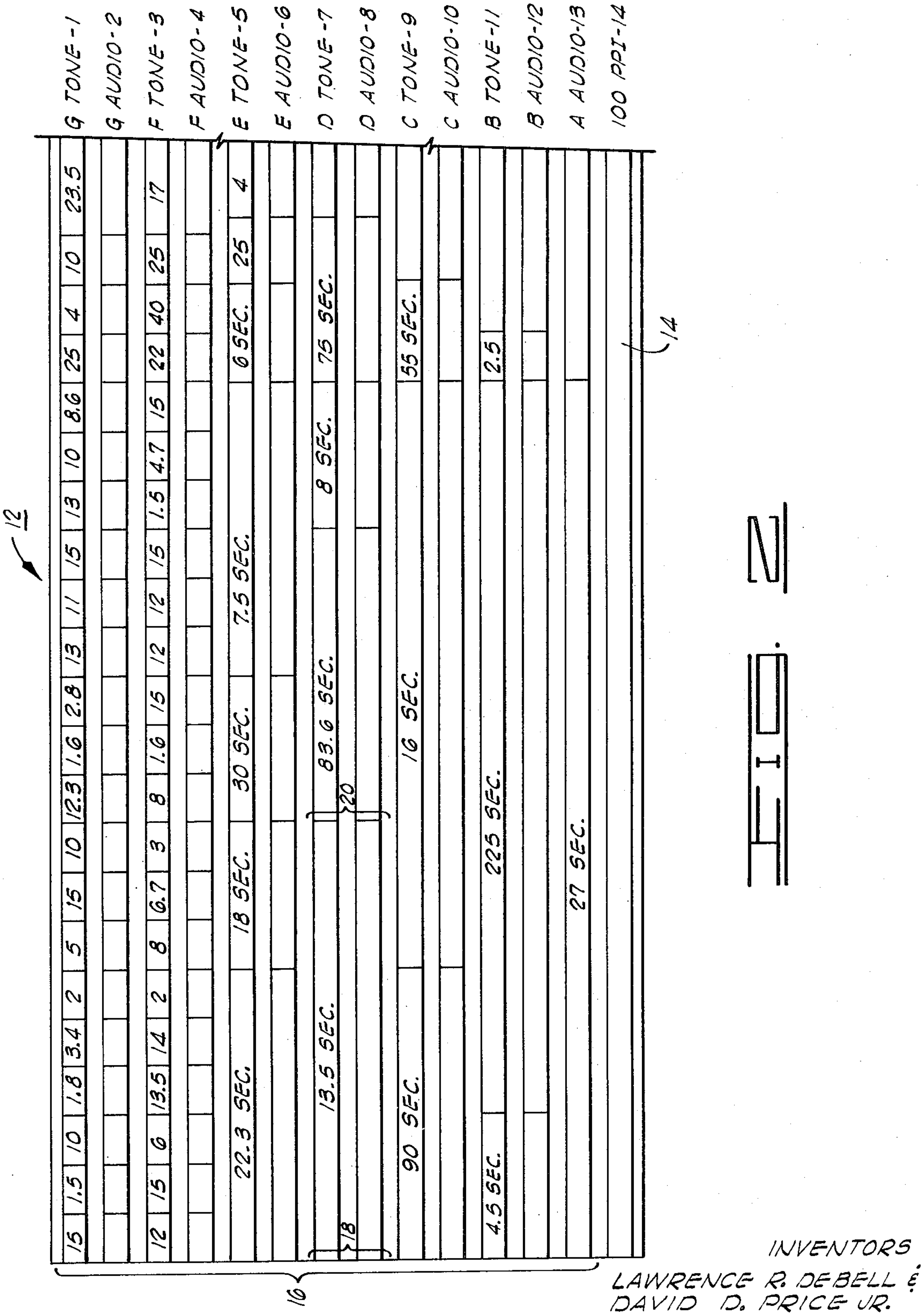
FIG. 2 is a pictorial representation of a portion of one type of record medium which is recorded utilizing the method of the invention.

With reference to FIG. 1, track selection 48 may be utilized to control the recording of audio information of selected time and spacing as well as its associated control tone on any of the plurality of recording track pairs as shown in FIG. 2. An entire branching record tape, including a large plurality of information and control tone tracks, may be recorded with the various message tracks being time-related as required by the branch configuration of the teaching program. As a general rule, the type and complexity of branching will be determined by the subject matter and program purpose; however, for most applications it would be necessary to have available a wide variation of playback speeds in order to enable several orders of information content within the branching structure.

The foregoing discloses a novel method and apparatus for recording known messages or audio information segments within specifically allotted tape space, and for further enabling equalization of one or more related information segments on other and parallel record tracks within the same or different allotted tape spaces, the method actually enabling accurate disposition of variable speed recorded information on a plurality of record tracks. The invention may be utilized for structuring one or more audio channels of record information and it is particularly useful in setting up complex branching playback of plural channel record tapes. Utilization of the invention permits the use of recordings with a broad range of discrete speeds, further to enable a greater number of orders or levels of complexity within the information presentation structure.

Changes may be made in the combination and arrangement of elements as herefore set forth in the specification and shown in the drawings; it being understood that changes may be made in the embodiments disclosed without departing from the spirit and scope of the invention as defined in the following claims.

What is claimed is:

1. A method for recording and information segment of known time within designated start and stop limits of one record track of a plural track record medium which includes a reference track with pre-recorded constant-spaced pulses, the method comprising:

commencing recording of the information segment at the start limit of said one record track;

playing back said pre-recorded pulses to derive a record medium speed function;

continuously resolving the remaining record medium length to said stop limit and the remaining time in said information segment at a rate set by said speed function to derive an instantaneous speed control indication; and controlling the speed of recording in proportion to said instantaneous speed control indication.

2. A method as set forth in claim 1 wherein said step of continuously resolving further comprises:

varying a reference input voltage in accordance with elapsed time of said information segment known time, and providing said varied voltage as a first voltage output;

receiving said first voltage output and varying such output in accordance with elapsed record medium length between designated start and stop limits to derive a second output voltage indicative of and proportional to requisite instantaneous record medium speed; and providing said second output voltage for control of the speed of recording.

3. A method as set forth in claim 1 which is further characterized to include:

a plurality of companion pairs of records tracks one track of each pair receiving audio information of various time lengths between designated start and stop limits, and the remaining companion record track receiving constant frequency control signal for recording thereon between the same record medium length start and stop limits.

4. A method as set forth in claim 2 wherein said step of continuously resolving comprises:

varying a reference input voltage in accordance with elapsed time of said information segment known time, and providing said varied voltage as a first voltage output;

receiving said first voltage output and varying such output in accordance with elapsed record medium length between designated start and stop limits to derive a second output voltage indicative of and proportional to requisite instantaneous record medium speed; and providing said second output for control of the speed of recording.

5. A method for recording a predetermined duration of information within designated start and stop limits defining a pre-set length of a plural track record, comprising the steps of:

pre-recording one track of said plural track record at constant speed to record a pre-set number of pulses per inch;

recording said information on another of said plural tracks of said record;

playing back said recorded pulses from said one track simultaneously with recording of said information and counting said played back pulses to derive a speed function;

connecting a reference voltage in series through each of first and second variable resistance elements with a drive output being provided from said second variable resistance element;

varying the resistance of said first variable resistance element from a pre-set resistance at a constant rate;

oppositely varying the resistance of said second variable resistance element from a pre-set resistance at a rate set by said speed function; and controlling the speed of recording continuously in proportion to said drive output.

6. Apparatus for resolving the tape speed of a recording medium receiving a pre-set time of information segment for recording along a pre-set length of recording medium as defined by known start and stop limits, said recording medium also including a reference record track having constant spaced pulses recorded thereon, the apparatus comprising:

first variable resistance means receiving a reference voltage thereacross to provide a voltage output from the wiper element, said first resistance means being linearly variable in response to drive input thereto;

second variable resistance means energized by voltage output from the wiper element of said first variable resistance means and providing a tape drive output from the respective second wiper element of said second variable resistor means;

recording medium drive means actuated by said tape drive output to move said recording medium;

first drive means providing a constant motion input to said first variable resistor means to drive said wiper element to cause linear resistance variations;

playback means for transducing said constant spaced pulses from said reference record track, including circuit means to generate an actuation pulse output proportional to speed of the record medium; and intermittent drive means energized by said actuation pulse output from said playback means to drive said wiper element of the second variable resistor means in the direction opposite from the wiper element drive of the first variable resistor means.

7. Apparatus as set forth in claim 6 which is further characterized to include:

first adjustment means for setting the wiper element of said first variable resistance means at a selected position representative of said time of information segment; and second adjustment means for setting second wiper element of said second variable resistance means at a selected position representative of said length of recording medium.

8. Apparatus as set forth in claim 7 where each of said first and second adjustment means comprise:

respective first and second rotary adjusting dials coupled through first and second slip-clutch assemblies to each of the first and second wiper element drive inputs, each of said rotary adjusting dials serving to pre-set the respective first and second wiper element positions.

* * * * *